(12) United States Patent
Roosendaal et al.

(10) Patent No.: US 8,149,495 B2
(45) Date of Patent: Apr. 3, 2012

(54) REFLECTIVE DISPLAY HAVING IMPROVED BRIGHTNESS AND CONTRAST

(75) Inventors: Sander Jurgen Roosendaal, Eindhoven (NL); Martinus Hermanus Wilhelmus Maria Van Delden, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 347 days.

(21) Appl. No.: 12/097,421

(22) PCT Filed: Dec. 11, 2006

(86) PCT No.: PCT/IB2006/054740
§ 371 (c)(1),
(2), (4) Date: Jun. 13, 2008

(87) PCT Pub. No.: WO2007/069179
PCT Pub. Date: Jun. 21, 2007

(65) Prior Publication Data
US 2008/0278796 A1    Nov. 13, 2008

(30) Foreign Application Priority Data
Dec. 14, 2005 (EP) .................................. 05112172

(51) Int. Cl.
*G02B 26/00* (2006.01)
*G02F 1/15* (2006.01)
*G02F 1/1333* (2006.01)

(52) U.S. Cl. ........ 359/290; 359/265; 359/295; 359/298; 349/2; 349/58; 349/61; 349/62; 349/84; 349/95; 349/96; 349/97; 349/104; 349/202

(58) Field of Classification Search .......... 359/265–275, 359/296, 290–292, 295, 298; 349/2–12, 349/96, 97, 104–109, 202, 58, 61–67, 84, 349/95; 345/54–108
See application file for complete search history.

(56) References Cited

U.S. PATENT DOCUMENTS

| 5,500,750 | A | 3/1996 | Kanbe et al. |
| 5,811,866 | A | 9/1998 | Hirata |
| 6,130,733 | A | 10/2000 | Lowe |
| 6,573,959 | B1 | 6/2003 | Molsen |

FOREIGN PATENT DOCUMENTS

| EP | 0763765 A1 | 3/1997 |
| JP | 07120744 A | 5/1995 |
| JP | 09005735 A | 1/1997 |
| JP | 2004347692 A | 12/2004 |
| WO | WO9422045 A1 | 9/1994 |
| WO | WO0140708 A2 | 6/2001 |

*Primary Examiner* — Evelyn A. Lester
(74) *Attorney, Agent, or Firm* — Larry Liberchuk (57) ABSTRACT

A reflective display, comprising a plurality of pixels (10), each having a first electrode, a light-modifying layer (12), and a second electrode (3; 16) arranged to enable formation of an electric field in the light-modifying layer (12) through application of a voltage between the electrodes. The pixel (10) further includes an active portion (16) which is switchable between light-modifying states by means of said electric field, and an inactive portion (17). The inactive portion (17) is arranged for reflecting light so as to direct at least a fraction of incoming light (20) impinging on the inactive portion (17) towards the active portion (16). As a result, a contrast ratio of the reflective display is improved, since light is now directed from the inactive portion towards the active portion and thus contributes to the displayed image as observed by a viewer.

18 Claims, 5 Drawing Sheets

REFLECTIVE DISPLAY HAVING IMPROVED BRIGHTNESS AND CONTRAST

The present invention relates to a reflective display, comprising a plurality of pixels, each having a first electrode, a light-modifying layer, and a second electrode arranged to enable formation of an electric field in the light-modifying layer through application of a voltage between the electrodes, wherein the pixel includes an active portion which is switchable between light-modifying states through alteration of a corresponding portion of the light-modifying layer by application of the voltage, and an inactive portion.

Flat panel displays of various kinds are presently the displays of choice for a variety of applications, ranging from full size television screens to minute displays in cheap hand-held devices. To accommodate all of these diverse applications, various types of flat panel displays have been developed and are being developed, utilizing various image forming technologies, such as liquid crystal technology, the electrowetting effect, electrophoresis and electrochromicity.

For applications where power consumption is the main concern, reflective displays, not requiring a backlight in order to display an image, are generally used. In a reflective display, light incident on the display is reflected differently in different areas of the display and an image thereby becomes visible to the user.

Generally, each pixel in a reflective display has an active portion, which can be switched between a reflective state and an absorbing state, and an inactive portion, which cannot be switched. Mostly, a reflector is provided in the active portion, and the reflective state is achieved by bringing the active portion in a transmissive state, so that light passes the active portion and is reflected by said reflector.

For example, in the case of an active matrix reflective liquid crystal display (LCD), each pixel is individually addressed and activated through applying a voltage over a liquid crystal layer sandwiched between two electrode layers. In order to drive individual pixels, a pixel electrode is typically connected to drive circuitry, which is normally implemented in the same plane as the pixel electrode.

In the case of such an LCD, the inactive portion of each pixel is formed by the drive circuitry implemented in the same plane as the reflective electrode layer, pixel selection lines and so on.

Traditionally, the inactive portions of pixels in a reflective display have been shielded by a black mask (also referred to as 'black matrix'). Light incident in the black mask portions cannot contribute to the brightness and/or contrast of the display. This leads to a loss in brightness and/or contrast of the display, which is especially serious for low ambient light conditions.

In U.S. Pat. No. 5,500,750, a liquid crystal display is disclosed, in which this problem is addressed through forming a reflective light shielding layer in order to shield the drive circuitry from incoming light and reflect light incident on the light shielding layer covering the pixel drive circuitry. The light shielding layer is disposed in the same plane as the reflective electrode layer and bumps are formed on the light shielding layer as well as on the reflective electrode layer in order to redirect obliquely incident light towards a direction vertical to the display. However, the contrast of this display appears to be unaffected or even adversely affected.

There is thus a need for an improved reflective display, in particular having an improved contrast.

In view of the above-mentioned and other drawbacks of the prior art, a general object of the present invention is to provide an improved reflective display, and in particular to provide a reflective display with an increased contrast ratio.

According to the present invention, these and other objects are achieved by a reflective display, comprising a plurality of pixels, each having a first electrode, a light-modifying layer, and a second electrode arranged to enable formation of an electric field in the light-modifying layer through application of a voltage between the electrodes, wherein the pixel includes an active portion which is switchable between light-modifying states by means of said electric field, and an inactive portion capable of reflecting light so as to direct at least a fraction of incoming light impinging on the inactive portion towards the active portion.

It should be noted that the reflective display according to the present invention is preferably flat and may be rigid or flexible depending on field of application.

The reflective display according to the present invention may further be either of a display in which the light-modifying layer is sandwiched between the first and second electrodes, and an in-plane display in which the first and second electrodes are provided in essentially the same plane.

It should also be noted that the reflective display according to the invention may have additional electrodes in each pixel and also additional light-modifying layers, which may be arranged in a stacked configuration.

The "contrast" of the display may, for example, be represented by the contrast ratio (CR), which is defined according to the following:

$$CR = I_{max}/I_{min},$$

where $I_{max}$ is the intensity of the light reflected from the display when in a state of maximum reflectance, and $I_{min}$ is the intensity of the light reflected from the display when in a state of minimum reflectance.

The present invention is based on the realization that the contrast ratio of a reflective display can be improved by redirecting light impinging on the inactive portion of the second electrode towards the active portion. If light is reflected off the inactive portion towards the active portion, it contributes to the displayed image. A larger fraction of incident light is reflected back towards the viewer, so that the image shown on the reflective display can have an increased maximum reflectance $I_{max}$, and thus an increased contrast ratio.

By providing in the inactive portion of the pixel a reflector capable of spreading reflected light with a larger angular spread than the active portion, more light can be directed from the inactive portion towards the active portion than in the reverse direction. Hereby, a net contribution to the amount of light impinging on the active portion can be achieved. This resulting increased amount of incoming light on the active portion results in improved brightness and contrast of the display.

Preferably, the inactive portion reflects light with a larger angular spread than the angular spread of light exiting from the active portion. In a preferred embodiment, the reflective display according to the present invention may then further include a substrate arranged to cover the light-modifying layer, the substrate having a higher index of refraction than an adjacent ambient medium, wherein the redirected fraction of incoming light is at least partly directed towards the active portion through total internal reflection at an interface between the substrate and the adjacent ambient medium.

The relatively large angular spread of light reflected off the inactive portion ensures that a significant fraction thereof propagates through the display at an angle that is larger than the critical angle at the interface between the substrate and the ambient medium, so that it is reflected at this interface, advantageously towards the active portions of the reflective display pixels. In preferred embodiments set out below, the configuration of the reflector in the inactive portions is further optimized so that the fraction of reflected light traveling at an angle larger than the critical angle is as high as possible.

For the substrate any suitable transparent material, such as glass or various types of plastic, may be used, and a typical adjacent ambient medium is air.

By adding a substrate in this manner, a large amount of the light impinging on the inactive portion of the pixel can be redirected towards the active portion through total internal reflection (TIR).

TIR occurs for light hitting the substrate-ambient interface at angles larger than a critical angle relative to an interface normal. The critical angle depends on the relation between the refractive indices of the substrate and the adjacent ambient medium according to the following relation:

$$\theta_{crit} = \arcsin(n_{ambient}/n_{substrate})$$

For example, in the case of glass ($n_{glass} \approx 1.5$) as a substrate material and air ($n_{air} = 1$) as the adjacent ambient medium, the critical angle becomes about 42°.

As stated above, the angular spread of the reflection in the inactive portion is preferably greater than that of the active portion, and thus a larger fraction of the light reflected by the inactive portion will hit the substrate-ambient interface with angles larger than the critical angle and thus be completely reflected back towards the second electrode.

The active portion may advantageously comprise any one of a Lambertian and a super-Lambertian reflector.

Generally, angular spread of a reflector may be indicated by a reflection cone, defining angular spread by the reflector of light impinging in a direction normal to the reflector. The reflection cone is given by the following relation:

$$I(\theta) = I_{0,m} \cos^m(\theta),$$

where $\theta$ is viewing angle with respect to a direction normal to the reflector, $I(\theta)$ is reflected intensity depending on the viewing angle, and $I_{0,m}$ is a normalization factor. The factor m determines the angular spread of the reflector, with a larger m yielding a more narrow reflection cone. Generally speaking, a reflector with a reflected intensity distribution given by the above relation with m=0 is called an isotropic reflector, a reflector having m=1 is called a Lambertian reflector, and reflectors having m>1 are called super-Lambertian reflectors.

By including in the active portion any one of a Lambertian and a super-Lambertian reflector, a good, paperlike appearance is achieved in the reflecting state.

According to one embodiment of the present invention, the inactive portion may comprise an essentially isotropic reflector.

As described above, an isotropic reflector is a reflector which reflects normally incoming light with a reflected intensity which is equal in all directions.

By including in the inactive portion an essentially isotropic reflector, a large portion of the light impinging on the inactive portion will be reflected towards the substrate-ambient interface at angles larger than the critical angle and, thus, reflected back towards the active portion. Hereby, a large portion of the light initially impinging on the inactive portion can be made to impinge on the active portion and thereby contribute to the brightness and contrast of the reflective display.

According to another embodiment of the present invention, the inactive portion may comprise a macro-structured reflector.

In the context of the present application, "a macro-structured reflector" should be understood as a reflector which is structured with dimensions that are typically more than 10 times larger than the wavelength of the reflected light, and which therefore reflects light incident in a given direction differently depending on position of incidence. It is noted that some refraction effects may be present in a reflector being structured with dimensions in the range of 10 times the wavelength of the reflected light. However, these refraction effects do not significantly alter the reflection behavior of the macro-structured reflector.

By including in the inactive portion a macro-structured reflector having suitable properties, a large portion of the incoming light impinging on the inactive portion can be, directly or indirectly, redirected towards the active portion.

Advantageously, the macro-structured reflector may be at least partly elevated with respect to the active portion.

Hereby, an efficient direct redirection of light towards the active portion is enabled.

Furthermore, the macro-structured reflector may be a beam-spreading structure having a base facing a plane defined by the second electrode and a top facing away from the plane, the top being narrower than the base.

The beam-spreading structure is thus arranged so that the top faces a viewer.

The sides, connecting the top and the base of the beam-spreading structure, may be straight or curved in a convex, concave, or undulating fashion, and the top of the beam-spreading structure may be sharp, rounded or flat.

This beam-spreading structure has an at least partly reflective surface, which may be formed by any suitable reflector, such as, for example, a metallic reflector.

Through this beam-spreading structure, a large fraction of the incoming light is, depending on direction of incidence, spread either directly towards the active portion, or towards the substrate-ambient interface at an angle larger than the critical angle, and, consequently, reflected again towards the active portion.

According to one embodiment, the beam-spreading structure may have an essentially V-shaped cross-section, the opening of the V facing the plane defined by the second electrode.

Furthermore, the beam-spreading structure may advantageously be essentially ridge-shaped.

Through the formation of a ridge shaped beam-spreading structure, very efficient redirection of incoming light can be obtained and the brightness and contrast of the reflective display thus much improved.

Preferably, an opening angle of the V-shaped cross-section may be smaller than 150°.

For practically all opening angles, the brightness of the reflective display is improved. The improvement in contrast is, however, largely dependent on the above opening angle. By forming the beam-spreading structure with a cross-section opening angle according to the above, a satisfactory contrast ratio is obtained for most illumination conditions.

Even more preferably, the opening angle of the V-shaped cross-section may be smaller than 90°.

Through this selection of opening angle, very efficient redirection of incoming light impinging on the inactive portion towards the active portion, and thereby improved contrast of the reflective display, is obtained for practically all illumination conditions.

According to another embodiment, the beam-spreading structure may have an essentially flat top which may be configured to absorb incident light.

Through this embodiment, which is particularly useful when formation of a suitable ridge-shaped beam-spreading structure is contrary to overall display design considerations, an efficient beam-spreading structure may be formed while occupying very little of the total display thickness. A large portion of the light incident on the sides of the beam-spreading structure according to the present embodiment will, directly or following total internal reflection as previously described, be spread towards the active portion, while light incident on the flat top of the beam-spreading structure will be absorbed rather than reflected back towards a viewer. Thereby, brightness and contrast of the display is improved.

According to a further embodiment, the top of the beam-spreading structure may comprise a plurality of reflective surface portions, each having different angles with respect to a line normal to the reflective display surface.

By forming the top of the beam-spreading structure in this manner, the top may be flat on a large scale, while still reflecting only a very small fraction of incident light back towards the viewer. Hereby, a small vertical form factor is combined with efficient redirection of incident light towards the active portion, mainly through total internal reflection as previously described.

The above-mentioned angles of the reflective surface portions may preferably be small to minimize the amount of light reflected back towards the viewer through double reflection.

Furthermore, the reflective portions of the beam-spreading structure may advantageously have a specular reflectivity, which is preferably larger than 60%.

According to a further embodiment of the present invention, the inactive portion may comprise a lens structure arranged to spreadingly refract incoming light to thereby enable redirection of the incoming light towards the active portion.

By spreadingly refracting incoming light prior to reflection, a large angular spread is achieved and redirection of a large portion of the light impinging on the inactive portion towards the active portion is thus achieved.

The lens structure may preferably be provided in the form of a plano-convex lens made of a material having a lower refractive index than an adjacent medium, which may, for example, be a plastic filling material, glue, the light-modifying layer or the substrate. This plano-convex lens may be provided with its planar side adjacent to a planar reflector in a plane defined by the second electrode, such as an isotropic reflector or a lambertian reflector, and its convex side facing away from the plane. The planar side of the plano-convex lens may thus preferably be arranged to face away from the viewer and the convex side consequently arranged to face the viewer. When hitting the convex lens surface, incoming light is refracted away from a lens surface normal, and, following reflection in the reflector below the planar lens side, once again refracted, this time towards the lens normal, whereby a very large angular spread of incoming light is achieved. The thus spread light may continue to be reflected back towards the active portion through TIR at the interface between the substrate and the adjacent ambient medium. A portion of the incident light will also be reflected at the interface between the surrounding medium and the convex side of the lens and thereby, if the lens structure is elevated with respect to the active portion, be directly redirected towards the active portion.

The lens structure may alternatively be provided in the form of a plano-concave lens in a material having a higher index of refraction than the surrounding medium. However, the plano-convex lens structure is preferred over this plano-concave lens.

According to one embodiment of the reflective display of the present invention, the light-modifying layer may be a liquid crystal layer, the inactive portion of the pixel may comprise a voltage control device, such as a thin film transistor, and the active portion of the pixel may comprise a reflective electrode which is configured to alter polarization state of a corresponding portion of the liquid crystal layer, such that a corresponding portion of the particular pixel is switched between light-modifying states.

In this embodiment of the present invention, the reflective display is consequently an active matrix type liquid crystal display (LCD). This LCD may have the liquid crystal layer sandwiched between electrode layers or function through so-called in-plane switching, in which case the first and second electrodes are in the same plane.

According to another embodiment of the reflective display of the present invention, the light-modifying layer may comprise a fluid, the first electrode may comprise a fluid which is immiscible with the colored fluid, and the active portion of the pixel may be configured to laterally displace the colored fluid through application of a voltage between the electrodes, such that a corresponding portion of the particular pixel is switched between light-modifying states.

In this embodiment of the present invention, the reflective display is consequently an electrowetting display.

According to a further embodiment of the reflective display of the present invention, the light-modifying layer may comprise a fluid and a plurality of colored charged particles suspended therein, and the active portion of the pixel may be configured to displace, in a direction perpendicular to a plane defined by the second electrode, the plurality of charged particles through application of a voltage between the electrodes, such that a corresponding portion of the particular pixel is switched between light-modifying states.

In this embodiment of the present invention, the reflective display is consequently an electrophoretic display. This electrophoretic display may have the light-modifying layer sandwiched between electrode layers or function through so-called in-plane switching, in which case the first and second electrodes are in the same plane.

These and other aspects of the present invention will now be described in more detail, with reference to the appended drawings showing currently preferred embodiments of the invention.

In the following description, the present invention is described with reference to a reflective liquid crystal panel having a liquid crystal layer sandwiched between a first transparent electrode layer and a second electrode layer. It should be noted that this by no means limits the scope of the invention, which is equally applicable to other types of reflective displays, such as electrowetting displays, electrophoretic displays, and electrochromic displays. It should, furthermore, be noted that several of these display types also may function through so-called in-plane switching in which case the first and second electrodes are in the same plane. This is especially the case for liquid crystal displays and electrophoretic displays.

Figure 1:
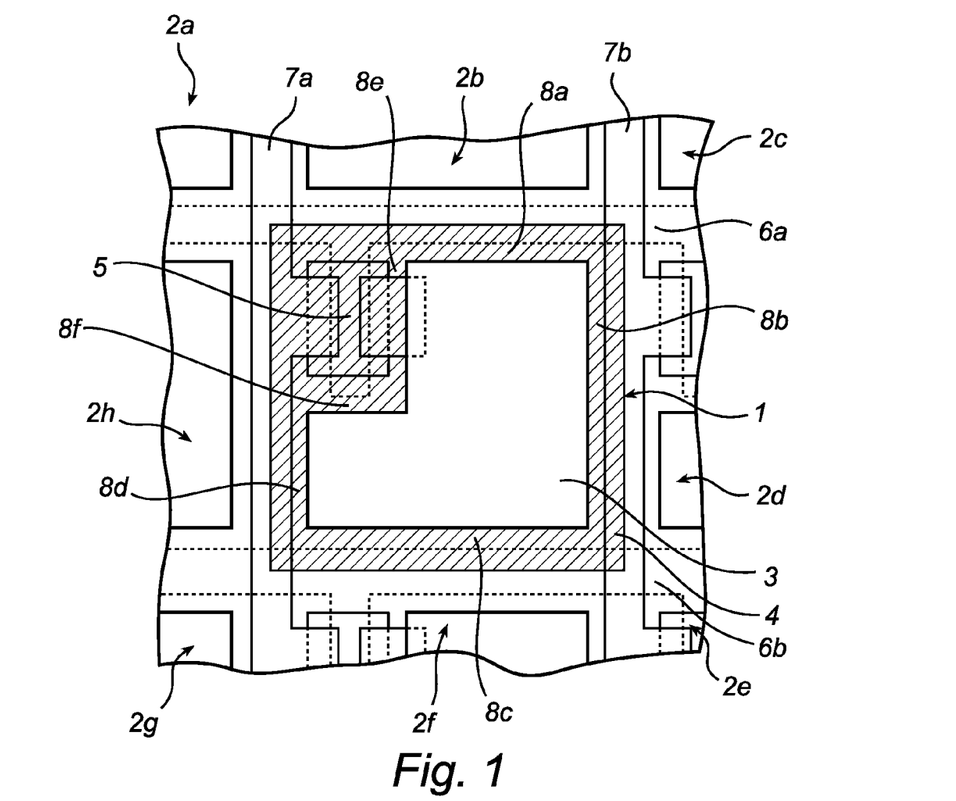
FIG. 1 is a schematic plane view of a portion of an exemplary reflective display.

FIG. 1 schematically shows a plane view of a portion of an exemplary reflective display. In particular, FIG. 1 shows a portion of the second layer of a reflective liquid crystal panel.

In FIG. 1, an area 1 of the second layer corresponding to a full pixel is shown surrounded by portions 2a-h of areas corresponding to adjacent pixels. The area 1 corresponding to the full pixel is occupied by an active portion in the form of a reflective electrode layer portion 3 and an inactive portion 4 (hatched in FIG. 1). In the exemplary reflective display segment illustrated in FIG. 1, the inactive portion 4 is mainly constituted by a thin film transistor (TFT) 5 used for driving the reflective electrode 3, portions of horizontal 6a-b and vertical 7a-b pixel selection lines and insulating traces 8a-e separating the reflective electrode layer portion 3 from the TFT 5 and the horizontal 6a-b and vertical 7a-b pixel selection lines. When applying a control voltage to the reflective electrode 3, a pixel area corresponding to this reflective electrode 3 is switched to allow or restrict reflection of incident light. However, a sizeable portion of the pixel, corresponding to the inactive portion 4, remains unaffected by the application of the control voltage.

It will, in the following description of preferred embodiments of the present invention be shown how at least a fraction of the light incident on this inactive portion can be redirected towards the reflective electrode layer portion 3 and thereby contribute to the brightness and contrast of the liquid crystal panel.

In the present description, for the purpose of clarity, the various embodiments of the invention are described using highly simplified illustrations of a reflective display in which various layers well known in the art, such as alignment layers, polarizing layers, upper transparent electrode layer, TFT-formation layers etc are not specifically indicated. For the skilled person in the field it should, however, be obvious how to apply these various features to the described embodiments.

Figure 2A:
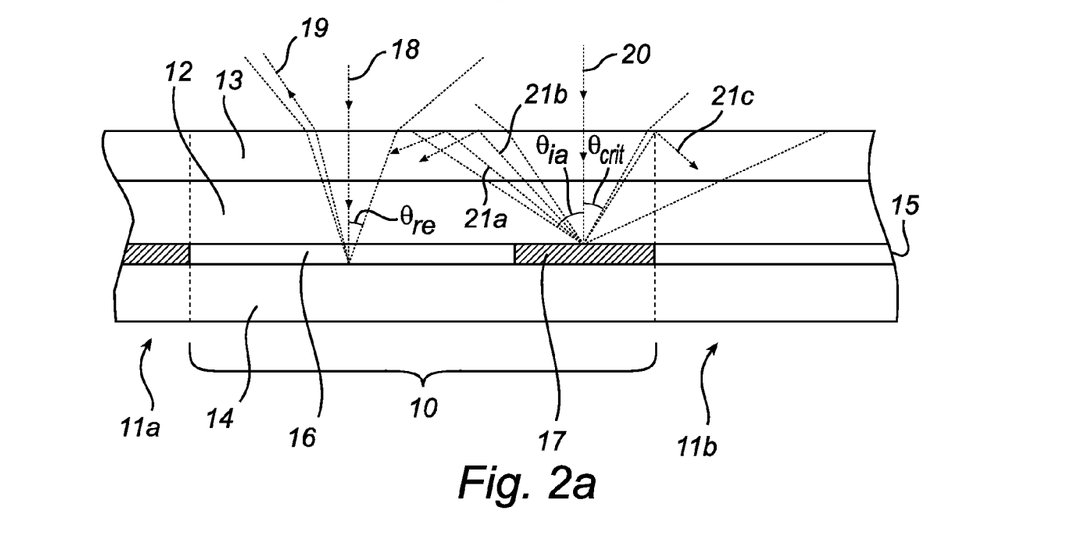
FIG. 2a is a schematic section view of a portion of a reflective display according to a first embodiment of the present invention, FIG. 2b schematically illustrates reflection behaviors of different types of reflectors.

FIG. 2a is a schematic section view of a reflective display according to a first embodiment of the present invention.

In FIG. 2a, one full pixel 10 is shown surrounded by portions of two adjacent pixels 11a-b. The schematic pixel 10 includes a liquid crystal layer 12 sandwiched between a first substrate 13 which is covered with a first, transparent electrode layer (not shown) and a second substrate 14 which is covered by a second layer 15 having a reflective electrode layer portion 16 and an inactive portion 17. In order to achieve a user-friendly paperlike appearance of a liquid crystal display comprising the liquid crystal panel, the reflective electrode layer portion 16 is preferably formed by a diffuse reflector having a narrow reflection cone, such as a Lambertian or a super-Lambertian reflector, which may, for example, be formed by an In-Cell Diffuse Reflector (IDR) commonly used in reflective LCD-technology. The reflection cone of the reflective electrode layer portion 16 is defined by an angle $\theta_{re}$ with respect to a normal of the reflective electrode surface. The inactive portion 17 of the second layer, on the other hand, is formed by an essentially isotropic reflector, which may, for example, have been created by using highly scattering material, such as layers containing small diffusing particles made of, for example, $TiO_2$. The reflection cone of the inactive portion is defined by the angle $\theta_{ia}$ as indicated in FIG. 2, and an incident light beam 18 normal to the first substrate 13 is substantially reflected in directions within the indicated reflection cone, as illustrated by the reflected light beam 19.

In the present exemplary embodiment, the first substrate 13 is formed by glass, having a refractive index $n_{glass}$ of about 1.5. With the adjacent ambient medium being air, having a refractive index $n_{air}$ of 1, the critical angle $\theta_{crit}$ for total internal reflection (TIR) becomes $\arcsin(1/1.5) \approx 42°$. This means that all the light in the reflection cone of the inactive portion having a reflection angle larger than the critical angle $\theta_{crit}$, assuming no additional refraction at other layer interfaces traversed by a beam of light from the reflector to the upper interface between the substrate 13 and the ambient, will be reflected back towards to second layer 15 at this interface, as illustrated by the incoming light beam 20 and corresponding reflected light beams 21a-c. The majority of this light reflected through TIR will eventually end up on the reflective electrode layer portion 16 and thus contribute to the brightness and contrast of the liquid crystal panel.

Figure 2B:
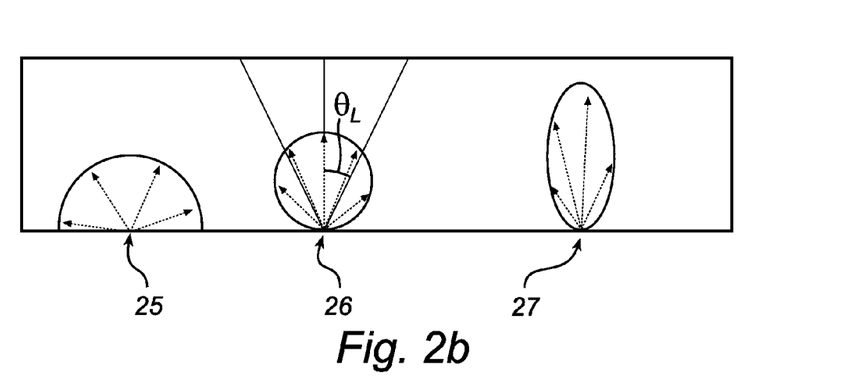

In FIG. 2b, reflection behaviors of different types of reflectors are schematically illustrated. From left to right in FIG. 2b, reflection behaviors of isotropic 25, Lambertian 26, and super-Lambertian 27 reflectors are illustrated. For the Lambertian reflector 26, a reflection cone defined by the angle $\theta_L$ is indicated. The reflection cone is a convenient measure for the angular spread of a reflector.

FIGS. 3a-d are schematic section views illustrating four examples of a reflective display according to a second embodiment of the present invention.

Figure 3A:
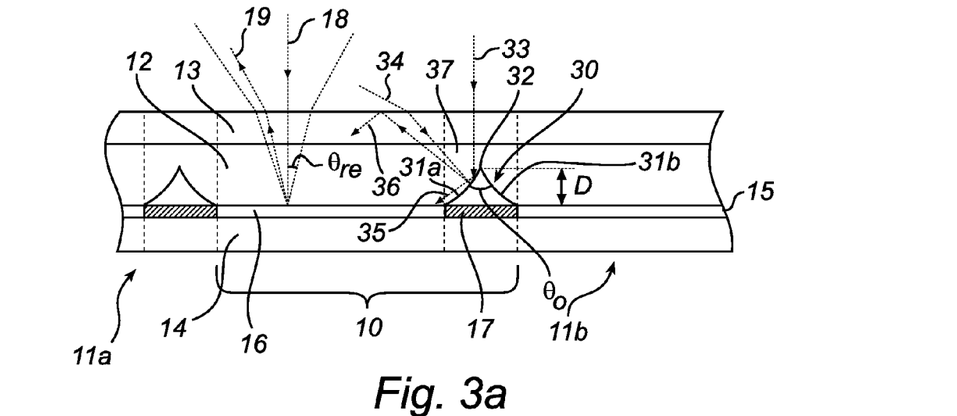
FIGS. 3a-d are schematic section views illustrating portions of four exemplary reflective display according to a second embodiment of the present invention.

Referring to FIG. 3a schematically showing a liquid crystal panel according to a first example of the second embodiment of the present invention, the illustrated liquid crystal panel differs from the liquid crystal panel shown in FIG. 2 in that the inactive portion 17, according to this first example, comprises a macro-structured reflector in the form of an essentially ridge-shaped beam-spreading structure 30 having an essentially V-shaped cross-section pointing towards the first electrode layer (not shown) provided on the first substrate 13. The ridge-shaped structure 30 according to the present first example has concave sides 31a-b covered with a metallic reflector material, such as aluminum (Al), silver (Ag) or an aluminum-neodynium (Al—Nd) alloy, and a pointed edge 32, and extends from the second substrate 14 a distance D towards the first substrate 12. The ridge-structure 30 is further defined by an opening angle $\theta_o$ as indicated in the figure. The gap 37 between the ridge-shaped structure 30 and the surrounding first electrode layer (not shown) and liquid crystal layer 12 is preferably filled using an essentially transparent filler, such as glue, which advantageously has an index of refraction which is matched with that of the surrounding structures.

As illustrated by incoming light beams 33 and 34 and corresponding reflected light beams 35 and 36, respectively, a large portion of the light incident on the inactive portion is redirected towards the reflective electrode layer portion 16, either directly or indirectly, following total internal reflection at the interface between the first substrate 13 and the ambient.

Figure 3B:
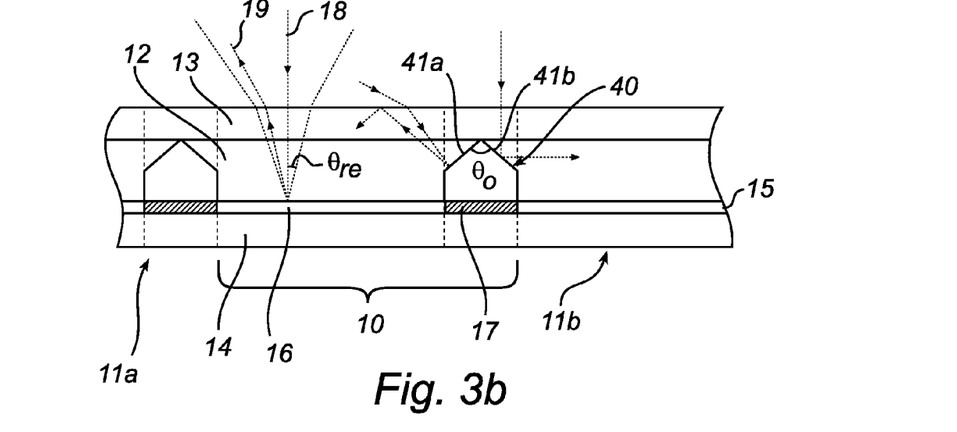

In FIG. 3b, a second example of the second embodiment of the liquid crystal panel according to the present invention is schematically shown having a macro-structured reflector in the form of a ridge-shaped beam spreading structure 40 with straight slanted sides 41a-b extending partly down the height of the ridge. The ridge-structure 40 is defined by an opening angle $\theta_o$ as indicated in the figure. The function of the beam-spreading structure 40 shown in FIG. 4b is similar to that of FIG. 4a.

Figure 3C:
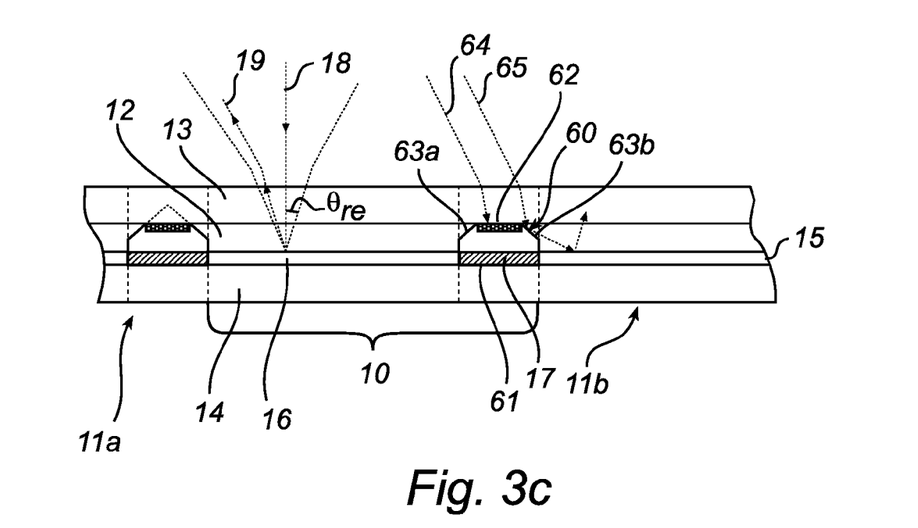

Referring now to FIG. 3c, a third example of a reflective display according to the second embodiment of the present invention will be described.

In FIG. 3c, a beam-spreading structure 60 is shown having a base 61 facing the second electrode layer 15 and a top 62 facing the first transparent electrode layer (not shown). The top 62 is flat and configured to absorb incident light, and the sides 63a-b connecting the top 62 and the base 61 are reflective and angled to reflect incoming light towards the active layer portion 16, directly or through total internal reflection at the interface between the first substrate 13 and the ambient. This is illustrated by incoming light beams 64, which is absorbed by the top 62 of the beam spreading structure 60, and 65 which is reflected towards the active layer portion 16.

Figure 3D:
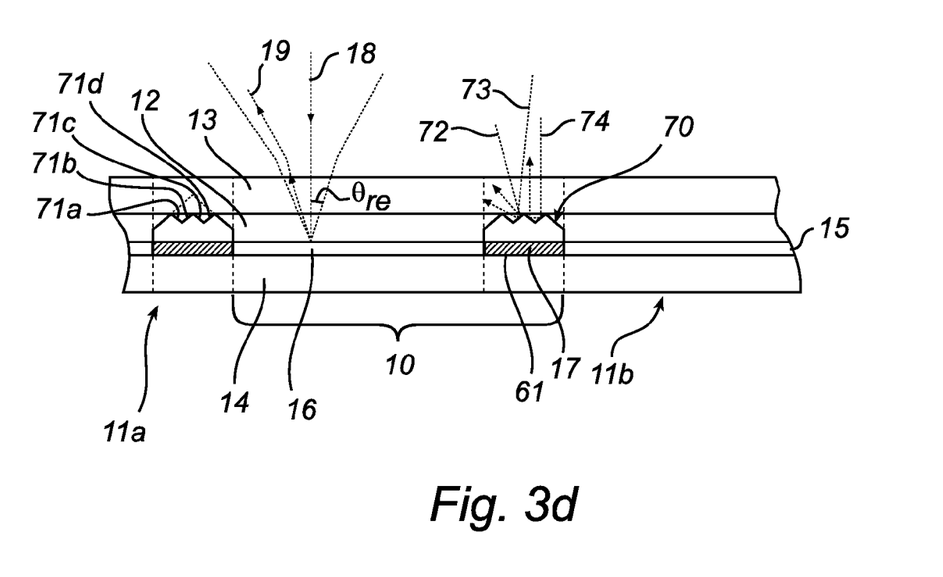
Figure 4A:
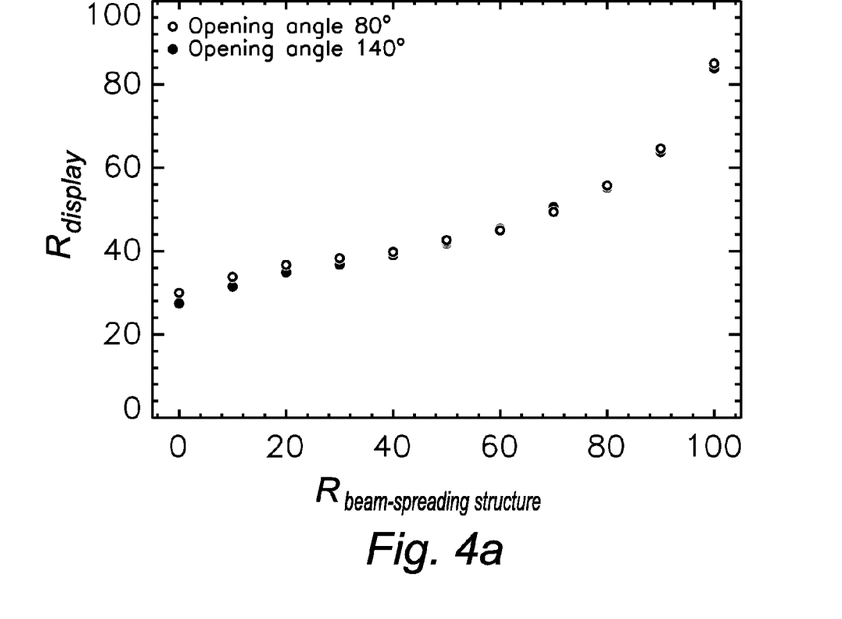
FIG. 4a is a diagram illustrating display reflectivity as a function of beam-spreading structure reflectivity as calculated for the reflective display in FIG. 4b.
Figure 4B:
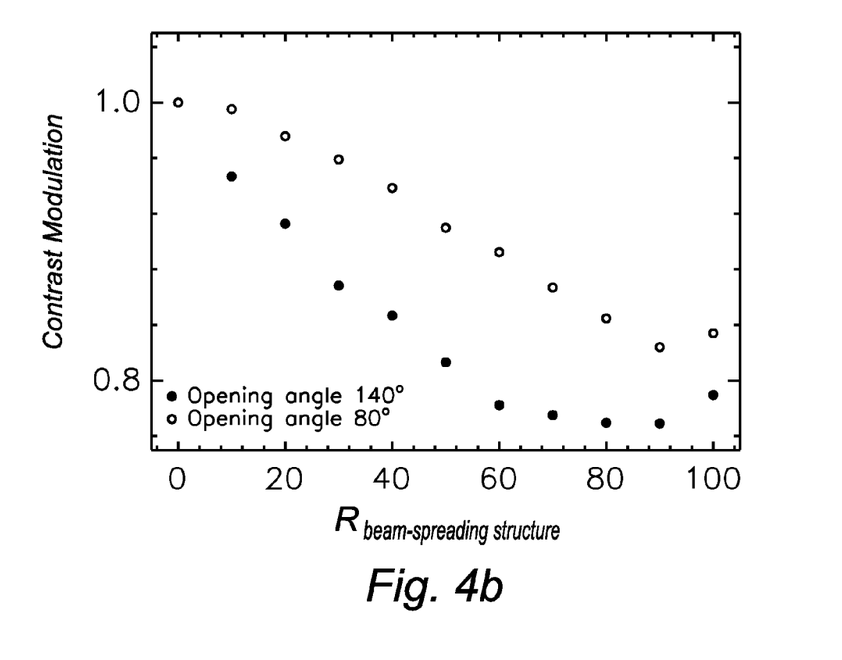
FIG. 4b is a diagram illustrating contrast modulation as a function of beam-spreading structure reflectivity as calculated for the reflective display in FIG. 4b.

In FIG. 3d, illustrating a fourth example of the present embodiment, the absorbing top 62 of FIG. 4c is replaced by a top 70 which has reflective surfaces 71a-d which are angled with respect to a normal to the display so that a large portion of incident light is reflected with angles larger than the critical angle for total internal reflection, and thereby reflected back towards the second electrode layer following total internal reflection at the interface between the first substrate 13 and the ambient. This is illustrated by incident light beams 72 and 73. The reflective surfaces 71a-d preferably form rather small angles to the normal so that double reflection, as illustrated by incident light beam 74, is minimized. FIGS. 4a-b illustrate performance of an exemplary reflective display depending on reflectivity and opening angle of a beam-spreading structure comprised in the second embodiment of the present invention. The calculations upon which the graphs in FIGS. 4a-b are based are performed assuming diffuse illumination and the active layer portion being a Lambertian reflector.

In FIG. 4a, it is shown how brightness, equivalent to reflectivity, of a reflective display depends on the reflectivity of the ridge-shaped beam spreading structure 40 of FIG. 3b for two opening angles, $\theta_o$. As can be seen in FIG. 4a, a larger beam-spreading structure reflectivity gives a larger display reflectivity, or brightness.

In FIG. 4b, contrast modulation of a reflective display as a function of reflectivity of the ridge-shaped beam-spreading structure 40 in FIG. 3b is illustrated. The contrast modulation M is given by the following relation:

$$M=(CR-1)/(CR+1)$$

Here, CR is the contrast ratio of the liquid crystal panel. For electronic reading and signage, the contrast modulation M should preferably be larger than 0.8, which, as can be seen in FIG. 4b, for an opening angle of 80° is obtained for all beam-spreading structure reflectivities, while a reflectivity below about 60% is favorable for an opening angle of 140°. Taken together with the behavior according to FIG. 4a, it is understood that a good choice for beam-spreading structure reflectivity is 60%.

Figure 5:
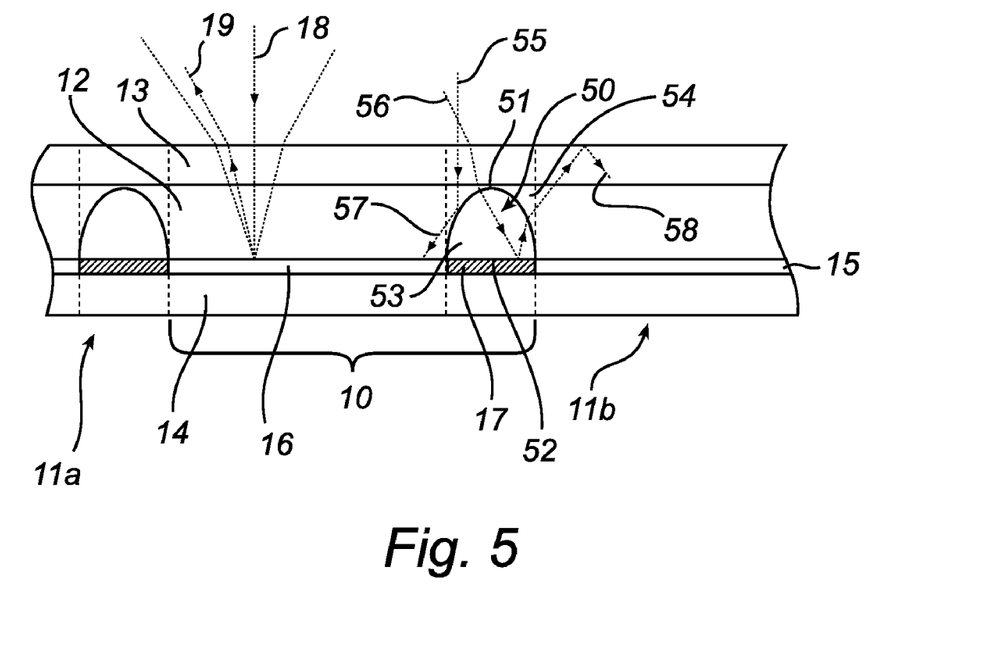
FIG. 5 is a schematic section view of a portion of a reflective display according to a third embodiment of the present invention.

FIG. 5 is a schematic section view of a portion of a liquid crystal panel according to a third embodiment of the present invention.

In FIG. 5, the illustrated liquid crystal panel differs from the liquid crystal panel shown in FIG. 2 in that the inactive portion 17, according to this third embodiment, comprises a lens structure, in the form of a plano-convex lens 50 arranged with its convex side 51 facing the transparent electrode (not shown) provided on the first substrate 13, and its planar side 52 adjacent to a diffuse reflector, such as a Lambertian or an isotropic reflector in the inactive portion 17 of the second layer 15. The material on the inside 53 of the lens 50 has a lower index of refraction that the material on the outside 54 of the lens. The filling material is preferably an essentially transparent filler, such as glue, which advantageously has an index of refraction which is matched with that of the surrounding structures.

As illustrated by incoming light beams 55 and 56 and corresponding reflected light beams 57 and 58, respectively, a large portion of the light incident on the inactive portion is redirected towards the reflective electrode layer portion 16, either directly or indirectly, following total internal reflection at the interface between the first substrate 13 and the ambient. Since the inside 53 of the plano-convex lens 50 has a lower index of refraction than the outside 54, the lens 50 spreadingly refracts incoming light as illustrated by the incoming light beam 56, which is refracted away from a normal of the convex surface 51 of the lens 50. Following reflection in the inactive portion reflector, the refracted incoming light beam 56 is once again refracted upon exit from the lens 50, this time towards a normal of the convex surface 51 of the lens 50.

Due to its passage through the lens 50, the reflected beam 58 has thus been sufficiently spread in order to hit the interface between the first substrate 13 and the ambient at an angle larger than the critical angle to thereby be reflected back towards the second layer 15 through total internal reflection.

The person skilled in the art realizes that the present invention by no means is limited to the preferred embodiments. For example, the macro-structured reflector may advantageously have a top coating of multilayer reflectors. Such multilayer reflectors may be designed having a lower absorption than metallic reflectors. Furthermore, the various diffuse reflectors may be formed in other way than those described above, such as in the form of sub-wavelength structures (structures typically having dimensions smaller than wavelengths of the reflected light) such as gratings or holographic structures. By using such structures, the direction of reflection of light can be modified.

The invention claimed is:

1. A reflective display, comprising a plurality of pixels, each having:
   a first electrode;
   a light-modifying layer; and
   a second electrode arranged to enable formation of an electric field in said light-modifying layer through application of a voltage between said electrodes,
   wherein said pixel includes:
   an active portion which is switchable between light-modifying states by means of said electric field, and
   an inactive portion capable of reflecting light so as to direct at least a fraction of incoming light impinging on said inactive portion towards said active portion.

2. A reflective display according to claim 1, wherein the inactive portion is capable of reflecting light with a larger angular spread than the angular spread of light exiting the active portion.

3. A reflective display according to claim 1, further comprising a substrate arranged to cover the light-modifying layer at the viewing side of the display, said substrate having a higher index of refraction than an adjacent ambient medium, wherein said fraction of incoming light reflected off the inactive portion is at least partly directed towards said active portion through total internal reflection at an interface between said substrate and said adjacent ambient medium.

4. A reflective display according to claim 1, wherein said active portion comprises any one of a Lambertian and a super-Lambertian reflector.

5. A reflective display according to claim 1, wherein said inactive portion comprises an essentially isotropic reflector.

6. A reflective display according to claim 1, wherein said inactive portion comprises a macro-structured reflector.

7. A reflective display according to claim 6, wherein said macro-structured reflector is at least partly elevated with respect to said active portion.

8. A reflective display according to claim 6, wherein said macro-structured reflector is a beam-spreading structure having a base facing a plane defined by the second electrode and a top facing away from said plane, the top being narrower than the base.

9. A reflective display according to claim 8, wherein said beam-spreading structure has an essentially V-shaped cross-section, the opening of the V facing said plane.

10. A reflective display according to claim 8, wherein said macro-structured reflector is essentially ridge-shaped.

11. A reflective display according to claim 8, wherein an opening angle ($\theta_0$) of the cross-section of the beam-spreading structure is smaller than 150°.

12. A reflective display according to claim 11, wherein said opening angle ($\theta_0$) is smaller than 90°.

13. A reflective display according to claim 8, wherein said top of the beam-spreading structure is essentially flat and is configured, by the active portion, to absorb incident light.

14. A reflective display according to claim 8, wherein said top of the beam-spreading structure comprises a plurality of reflective surface portions, each having different angles with respect to a line normal to the reflective display surface.

15. A reflective display according to claim 1, wherein the inactive portion comprises a lens structure arranged to spreadingly refract incoming light to thereby enable redirection of the incoming light towards the active portion.

16. A reflective display according to claim 1, wherein:
said light-modifying layer is a liquid crystal layer;
said inactive portion of said pixel comprises a voltage control device; and
said active portion of said pixel comprises a reflective electrode which is configured to alter a polarization state of a corresponding portion of said liquid crystal layer, such that a corresponding portion of the particular pixel is switched between light-modifying states.

17. A reflective display according to claim 1, wherein:
said light-modifying layer comprises a colored fluid;
said first electrode comprises a fluid which is immiscible with said colored fluid; and
said active portion of said pixel is configured to laterally displace said colored fluid through application of said voltage between said electrodes, such that a corresponding portion of the particular pixel is switched between light-modifying states.

18. A reflective display according to claim 1, wherein:
said light-modifying layer comprises a fluid and a plurality of colored charged particles suspended therein; and
said active portion of said pixel is configured to displace, in a direction perpendicular to a plane defined by said second electrode, said plurality of charged particles through application of said voltage between said electrodes, such that a corresponding portion of the particular pixel is switched between light-modifying states.

* * * * *